United States Patent
Geyer et al.

(10) Patent No.: US 6,909,042 B2
(45) Date of Patent: Jun. 21, 2005

(54) SATELLITE SOLAR GENERATOR STRUCTURE COMPRISING BRACING ELEMENTS BETWEEN PANELS

(75) Inventors: Freddy Geyer, Cannes (FR); Daniel Viale, Tanneron (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 10/472,865

(22) PCT Filed: Mar. 25, 2002

(86) PCT No.: PCT/FR02/01029

§ 371 (c)(1),
(2), (4) Date: Sep. 24, 2003

(87) PCT Pub. No.: WO02/079034

PCT Pub. Date: Oct. 10, 2002

(65) Prior Publication Data

US 2004/0094193 A1 May 20, 2004

(30) Foreign Application Priority Data

Mar. 29, 2001 (FR) .......................................... 01 04251

(51) Int. Cl.⁷ ..................... H01L 31/045; H01L 31/052; B64G 1/44
(52) U.S. Cl. ...................... 136/244; 136/245; 136/292; 136/251; 244/173
(58) Field of Search ................................ 136/244, 245, 136/292, 251; 244/173

(56) References Cited

U.S. PATENT DOCUMENTS

| | | | |
|---|---|---|---|
| 4,779,826 A | | 10/1988 | Kiendl |
| 5,098,042 A | * | 3/1992 | Viale .......................... 244/173 |
| 5,384,661 A | * | 1/1995 | Geyer et al. ................. 359/894 |
| 5,699,698 A | * | 12/1997 | Geyer ......................... 74/526 |
| 5,785,280 A | * | 7/1998 | Baghdasarian .............. 244/173 |
| 6,168,116 B1 | | 1/2001 | Renshall et al. |
| 6,177,627 B1 | | 1/2001 | Murphy et al. |
| 6,298,662 B1 | * | 10/2001 | Vezain et al. ................. 60/527 |
| 6,484,972 B1 | * | 11/2002 | Viale ...................... 244/158 R |
| 6,485,213 B1 | * | 11/2002 | Viale .......................... 403/12 |
| 6,722,614 B2 | * | 4/2004 | Ozawa et al. ........... 244/158 R |

FOREIGN PATENT DOCUMENTS

| | | |
|---|---|---|
| DE | 32 15 432 A1 | 10/1983 |
| EP | 0 754 625 A1 | 1/1997 |
| EP | 0 977 273 A1 | 2/2000 |
| JP | 58214500 A | 12/1983 |
| JP | 10-147298 A * | 6/1998 |

OTHER PUBLICATIONS

Patent Abstracts of Japan, vol. 1998, No. 11, Sep. 30, 1998 corresponding to JP 10 147298 A (Mitsubishi Electric Corp) dated Jun. 2, 1998.

\* cited by examiner

*Primary Examiner*—Alan Diamond
(74) *Attorney, Agent, or Firm*—Sughrue Mion, PLLC

(57) ABSTRACT

The satellite solar generator structure comprises a plurality of solar panels (PR, PS) each having a plane surface, the panels being disposed in superposition in said structure (ST), the structure including at least one rod (TI) holding said panels (PR, PS) pressed against one another, two successive panels being in contact via bearing points (AL) disposed at the peripheries of the panels. In this structure, spacers (CA) are distributed over the surfaces of the panels (PR, PS) and are disposed between pairs of successive panels in order to improve contact between two successive panels so that the structure presents better mechanical strength during the satellite launch stage. With this arrangement, a fraction of the forces is taken up by the spacers instead of being taken up by the panels, thus making it possible to optimize the solar generator, for example by reducing the weight of the panels constituting it.

5 Claims, 3 Drawing Sheets

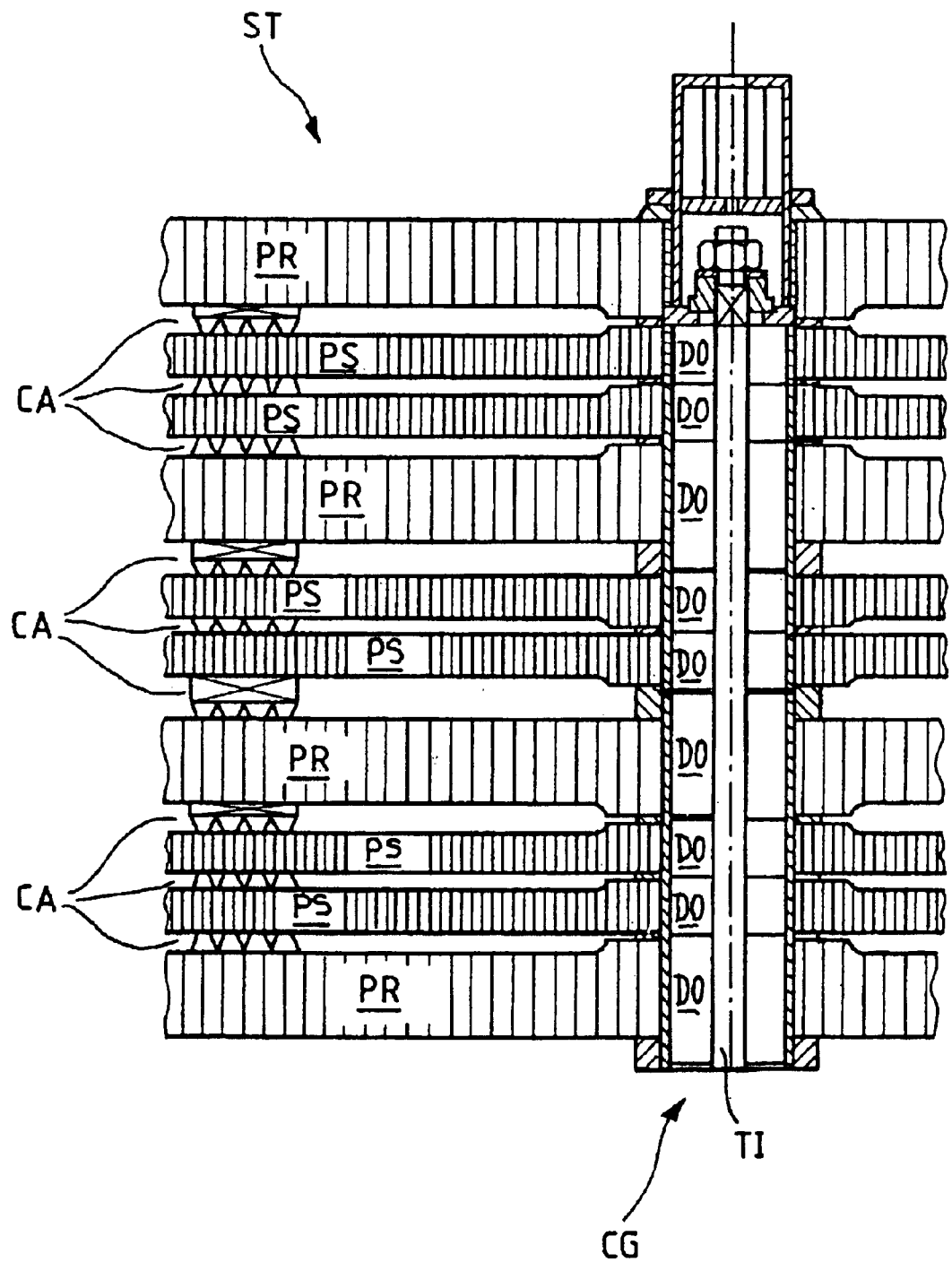
FIG_1

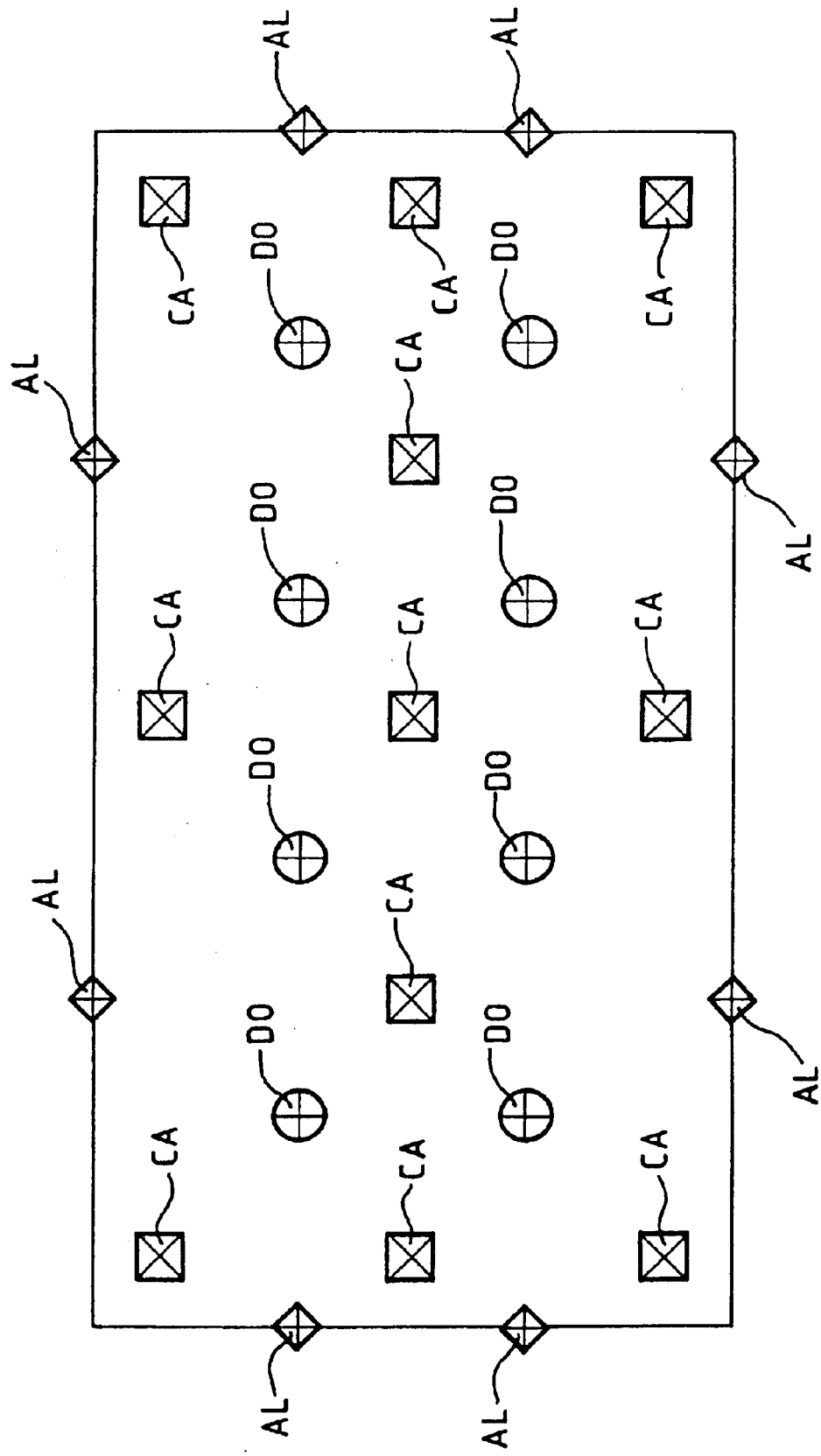

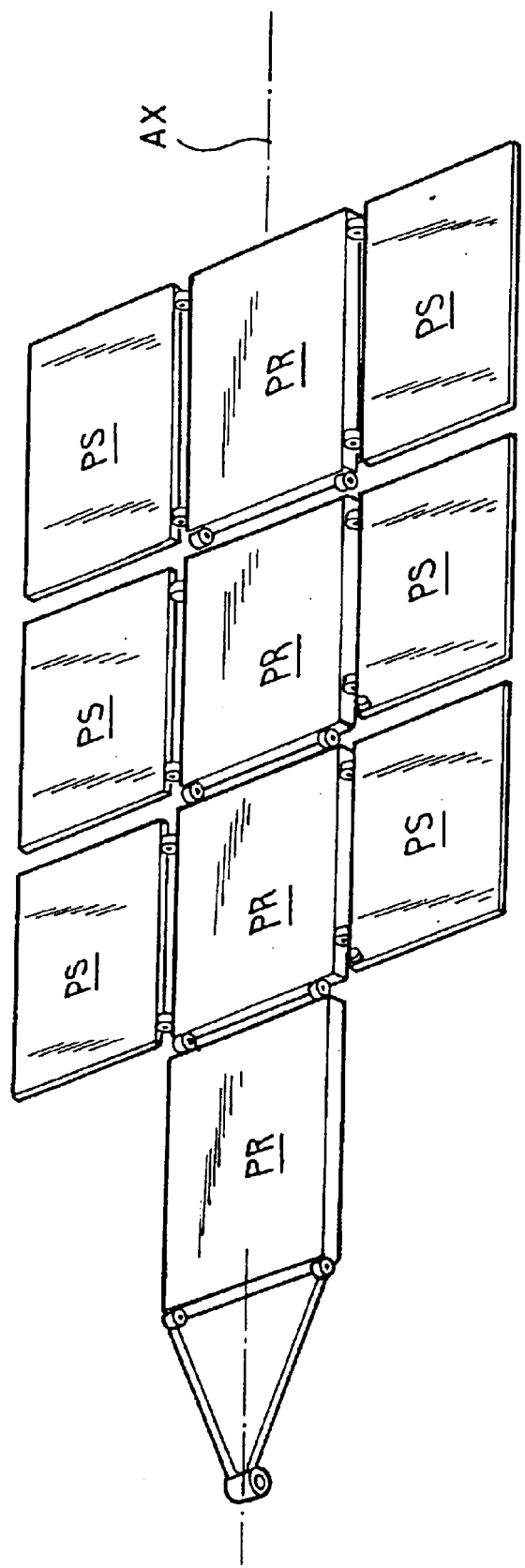
FIG_3

SATELLITE SOLAR GENERATOR STRUCTURE COMPRISING BRACING ELEMENTS BETWEEN PANELS

The present invention relates to a satellite solar generator structure comprising a plurality of solar panels each having a plane surface, said panels being disposed in superposition in said structure, said structure including at least one rod holding said panels pressed against one another, two successive panels being in contact via bearing points disposed at the peripheries of said panels.

The invention relates to solar generator structures designed to support photovoltaic panels in superposition during a satellite launch stage, and then to deploy the panels to form a generator, e.g. having all of its panels positioned in the same plane. The need to increase the power of such generators has led, for example, to using high-power photovoltaic cells which are implanted on panels arranged in a conventional structure, thereby leading to significant extra manufacturing cost since high-efficiency cells are very expensive. That kind of structure and the panels it includes are generally dimensioned by multidirectional forces that appear during the satellite launch stage, and more particularly by the various vibratory modes that are generated during said stage. In general, such structures include stacking columns that pass right through the stack of panels in a direction normal to the planes of the panels, and intended to hold the panels pressed against one another so as to take up mechanical forces as well as possible during the launch stage. Such stacking columns are constituted by a plurality of hollow bushings each secured to a panel and together forming a duct through which there passes a rod that compresses the bushings so as to bear against one another. These stacking columns are far enough away from the edges of the panels to avoid interfering with the movements during deployment.

With such a structure, adding a panel has the consequence of increasing the thickness of the stack and also the weight of the generator, without making it possible to achieve a satisfactory improvement in the power/weight ratio of the generator.

The object of the invention is to remedy that drawback by proposing a structure enabling the weight of panels to be reduced.

For this purpose, the invention provides a satellite solar generator structure comprising a plurality of solar panels each having a plane surface, said panels being disposed in superposition in said structure, said structure including at least one rod holding said panels pressed against one another, two successive panels being in contact via bearing points disposed at the peripheries of said panels, the structure being characterized in that spacers distributed over the surfaces of the panels are disposed between pairs of successive panels to improve contact between two successive panels so that said structure presents better mechanical strength during the launch stage of said satellite.

Such a construction causes a fraction of the forces to be taken up by the panels themselves via the spacers, thus making it possible, for example, to reduce the thickness of said panels in order to increase their number.

In a preferred embodiment of the invention, the superposition comprises in alternation two semi-rigid panels and one rigid panel. With this configuration, it is possible to use rigid panels that are conventional, with one of the semi-rigid panels having very specific dimensions in order to reduce development costs and manufacturing costs, given that semi-rigid panels are less complex.

In another particular embodiment of the invention, the structure comprises four rigid panels and six semi-rigid panels. With this dimensioning, the solar generator provides a high level of power while still being compact.

BRIEF DESCRIPTION OF THE DRAWINGS

The invention is described below in greater detail with reference to the accompanying drawings which show an embodiment by way of non-limiting example.

FIG. 1 is a fragmentary section view of the structure of the invention.

FIG. 2 is a diagram showing a panel of the structure a seen from above.

FIG. 3 is a diagram showing a variant structure of the invention in the deployed configuration, this variant comprising ten solar panels.

The structure ST of the invention as shown in FIG. 1 is constituted mainly by a stack of rectangular solar panels together forming substantially a rectangular parallelepiped. This stack comprises more particularly four rigid panels PR of greater thickness with six semirigid panels PS of smaller thickness interposed between them in pairs. These six panels are constituted, for example, by a honeycomb structure carrying an array of photovoltaic cells, and they are pierced by a plurality of stacking columns CG extending perpendicularly to the panels. These columns are designed to hold the panels pressed against one another so as to facilitate the takeup of the forces which are applied to the structure during the satellite launch stage. More generally, each stacking column CG is constituted by a plurality of superposed hollow bushings DO bearing against one another. Each bushing is made of metal or composite material and is secured to a corresponding panel. The bushings DO have a rod TI passing through them serving to compress the stack of panels and bearing against the bushings of the top and bottom panels of the structure. More particularly, the panels bear against one another via the hollow bushings DO at bearing points that are not shown in FIG. 1 but that are disposed at the periphery of each panel. Prior to the step of deploying the solar generator, each rod TI is cut, e.g. using a pyrotechnical method, so that the panels are mechanically freed from one another in order to allow them to be deployed.

In the structure of the invention, spacers CA are disposed between successive panels and are distributed over the surfaces of the panels so as to further increase mechanical coupling between two successive panels. The structure then forms a block that is better able to take up the forces that arise during launching. With the addition of such spacers, the stiffness of the panels themselves can be smaller, thereby contributing to improving the power/weight ratio of the assembly.

As can be seen in FIG. 2, the spacers CA of the structure of the invention are advantageously distributed uniformly over the surfaces of the panels so as to co-operate with the bushings DO and with the bearing surfaces AL to distribute points of contact uniformly over the entire surface of each panel. More particularly, FIG. 2 is a plan view of a panel having the structure of the invention and comprising eight bushings DO, eight bearing points AL, and having eleven spacers CA co-operating with these various bearing points to form a set of points of contact that are uniformly distributed over the entire surface area of the panel. This dimensioning is given by way of example and it will naturally be understood that the structure of the invention could have some other number of stacking columns, bearing points, and spacers without going beyond the ambit of the present invention. The spacers CA in the structure of the invention are, for example, stuck to the rear faces of the panels and bear against corresponding zones of the following panels. These spacers are made of elastic material enabling them to absorb vibration better, and they may be constituted by respective stacks each comprising a part for sticking to one of the panels and a contact part for pressing against the following panel. Each contact part may press against one or more cells or against a zone of the panel that does not have any cells, depending on circumstances.

As can be seen in FIG. 3, this structure is capable of deploying like a prior art structure so that the various panels take up positions in a single plane. More particularly, the rigid panels PR which are secured to one another unfold so as to occupy a line on an axis of symmetry AX of the solar generator. Each of the semi-rigid panels PS is connected to one of the rigid panels PR and is deployed sideways from the rigid panels PR.

In a variant, the semi-rigid panels PS may be reflecting panels that form an angle relative to the rigid panels PR in order to increase the light flux perceived by the rigid panels. In this variant, the semi-rigid panels PS are coated, for example, in a reflecting film, such as the films conventionally used in architectures for light-flux concentrating panels.

What is claimed is:

1. A satellite solar generator structure comprising:
   a plurality of solar panels each having a planar surface, said solar panels comprising rigid panels and semi-rigid thinner panels being disposed in superposition;
   at least one rod holding said solar panels pressed against one another, two successive solar panels being in contact via bearing points disposed at peripheries of said successive solar panels; and
   a plurality of spacers distributed over surfaces of each of the solar panels in order to provide, with the rod and the bearing points, a uniform distribution of contact points over the entire surface of each of the solar panels, and in this way are disposed between two successive panels to improve contact between two successive panels and thereby impart mechanical strength to said satellite solar generator structure during a launch stage of a satellite having said satellite solar generator structure.

2. The satellite solar generator structure according to claim 1, in which the superposition comprises in alternation two of the semi-rigid panels and one of the rigid panels.

3. The satellite solar generator structure according to claim 2, wherein said plurality of panels comprises four rigid panels and six semi-rigid panels.

4. The satellite solar generator structure according to claim 2, in which said semi-rigid panels are reflecting panels for increasing the light flux perceived by the rigid panels.

5. The satellite solar generator structure according to claim 1, in which said semi-rigid panels are reflecting panels for increasing the light flux perceived by the rigid panels.

* * * * *